United States Patent [19]

Kobayashi

[11] 4,391,639
[45] Jul. 5, 1983

[54] RECORDING LIQUID

[75] Inventor: Masatsune Kobayashi, Yokohama, Japan

[73] Assignee: Canon Kabushiki Kaisha, Tokyo, Japan

[21] Appl. No.: 413,989

[22] Filed: Sep. 2, 1982

[30] Foreign Application Priority Data

Sep. 10, 1981 [JP] Japan ................... 56-142644

[51] Int. Cl.³ .............................. C09D 11/02
[52] U.S. Cl. ......................... 106/22; 260/191
[58] Field of Search ................. 106/22; 260/191, 174

[56] References Cited

U.S. PATENT DOCUMENTS 3,741,954  6/1973  Altermatt ..................... 260/191
4,295,889 10/1981  Eida et al. ..................... 106/22
4,303,924 12/1981  Young, Jr. ..................... 106/22

Primary Examiner—John Kight, III
Assistant Examiner—Amelia B. Yarbrough
Attorney, Agent, or Firm—Fitzpatrick, Cella, Harper & Scinto

[57] ABSTRACT

A recording liquid is characterized by containing as a dye a compound represented by the formula

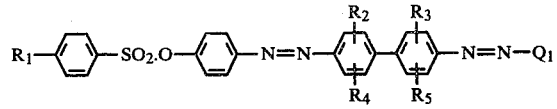

wherein $R_1$ represents hydrogen or $C_1$–$C_2$ alkyl, $R_2$ and $R_3$ each represent hydrogen, $C_1$–$C_2$ alkyl, or $C_1$–$C_2$ alkoxy, $R_4$ and $R_5$ represent hydrogen or sulfo in salt form with base, and $Q_1$ represents naphthyl substituted by hydroxyl and by sulfo in salt form with base.

3 Claims, No Drawings

RECORDING LIQUID

BACKGROUND OF THE INVENTION

1. Field of the Invention

This invention relates to recording liquid composition suitable for recording by means of writing tools or for so-called ink-jet recording process wherein said recording liquid composition is ejected from an orifice of a recording head to be flown as liquid droplets.

2. Description of the Prior Art

For carrying recording on paper or the like with writing tools (fountain pen, felt pen, etc.), there have long been used recording liquids, generally called "ink", which are solutions of various dyes in water or organic solvent.

Recording liquids of similar compositions are known to be used for the ink-jet recording process in which a recording liquid within a recording head is ejected by utilizing, for instance, oscillation of a piezo oscillator, electrostatic attraction due to a high voltage applied, or the like. However, much more strict performance characteristics are required for recording liquids used for the ink-jet recording process than for inks used for general writing tools such as fountain pens and felt pens.

The ink-jet recording process generates less noises and permits a high-speed recording and color recording on plain paper without any special fixing treatment, so that various types of ink-jet recording systems are investigated energetically.

Recording liquids for any of various types of ink-jet recording systems are demanded to fulfill the following requirements and the like:

(1) Physical properties of recording liquid such as viscosity and surface tension are each within a proper range.
(2) Solutes in recording liquid have a high stability of dissolved state (hereinafter, simply referred to as "dissolution stability") and do not plug fine ejecting orifices.
(3) Recording liquid gives images of sufficient optical density.
(4) Recording liquid does not make a change in physical properties or deposit solid matter during storage.

In addition to these requirements, recording liquids for the ink-jet recording process are desired to meet the following requirements:

(5) Recording can be performed without a restriction of the type of recording member on which a record is made.
(6) Recording liquid exhibits a high rate of fixing.
(7) Recording liquid gives images excellent in resistance to water, solvent (particularly alcohol), light, weather, and abrasion, in degree of resolution, and in the like.

However, images produced by conventional recording liquids, particularly by water-base recording liquids, tend to develop blotting, dislocations or scratches, or fading by water adhesion, mechanical friction, or light irradiation. In consequence, a recording liquid free from these drawbacks is looked for intensely.

Under such circumstances, a number of proposals have been made about recording liquids. Nevertheless, there has been obtained practically no recording liquid suited for actual use, in other words, meeting all the foregoing requirements.

SUMMARY OF THE INVENTION

The object of this invention is to provide a recording liquid satisfying all the requirements stated above, that is to say, a recording liquid which does not plug capillary tubes or ejecting orifices, does not result in deterioration or formation of precipitate during storage, is excellent in recording workability, particularly ejection stability and ejection responsiveness; and gives such good quality images as to be excellent in color density, shade, and contrast and have good resistance to water, solvent, light, weather, and abrasion and excellent fixing properties.

This object can be achieved with a recording liquid containing as a recording agent a compound represented by the formula

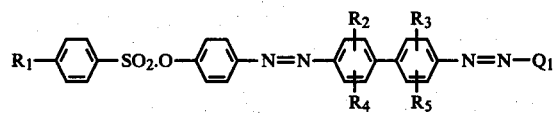

wherein $R_1$ represents hydrogen or $C_1$–$C_2$ alkyl, $R_2$ and $R_3$ each represent hydrogen, $C_1$–$C_2$ alkyl, or $C_1$–$C_2$ alkoxy, $R_4$ and $R_5$ each represent hydrogen or sulfo in salt form with base, and $Q_1$ represents naphthyl substituted by hydroxyl and by sulfo in salt form with base.

DETAILED DESCRIPTION OF THE INVENTION

According to this invention, it becomes possible by use of a specific recording agent of the above formula to obtain a recording liquid having an improved dissolution stability, particularly during a prolonged storage in concentrated form, and being excellent in workability for recording, particularly in ejection stability, ejection responsiveness, and continuous recording workability.

The recording liquid of this invention is an ink of extremely practical use which gives images having water resistance, alcohol resistance, light resistance, etc. at the same time.

The present recording liquid is composed, in principle, of the compounds (dyes) represented by the above formula and a liquid medium such as water or organic solvent. The compounds of the above formula have a markedly improved dissolution stability in the above-mentioned liquid media, thereby improving the ejection stability of the recording liquid and causing no plugging of the ejecting orifice even after a long rest of recording operation.

The amount of the dye represented by the above formula to be added is appropriately determined according to the desired optical density of image, the type of recording device to be used, other components to be added, the required physical properties of recording liquid, etc. But generally speaking, suitable content of the dye is in the range of 0.5–20%, preferably 0.5–15%, and particularly 1–10%, by weight based on the total weight of recording liquid composition.

The present recording liquid can contain, besides the present dye represented by the above formula as an essential component, other dye selected from various types of known dyes such as direct dyes, acid dyes, and the like.

The following show the structural formulae of examples of the compounds according to the above-formula specified in this invention:

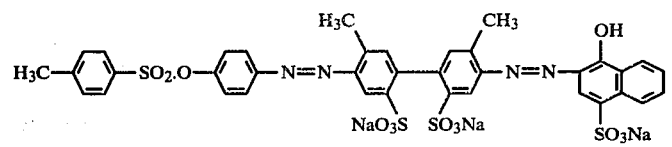 (1)
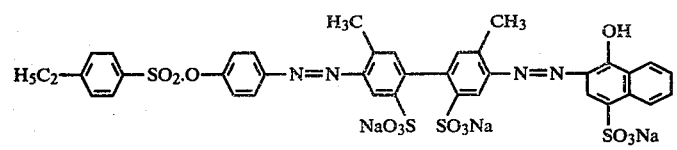 (2)
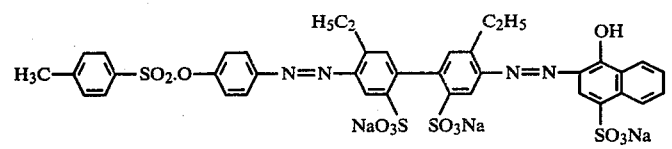 (3)
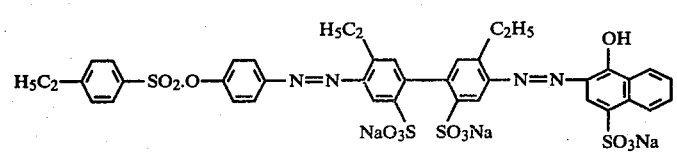 (4)
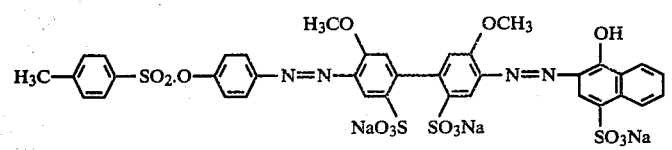 (5)
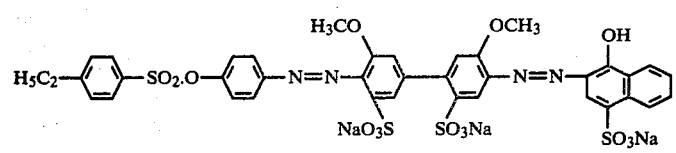 (6)
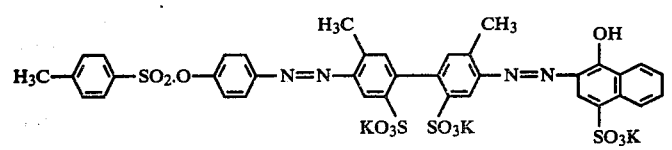 (7)
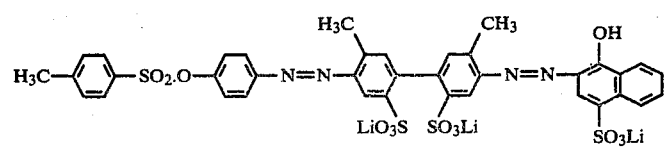 (8)
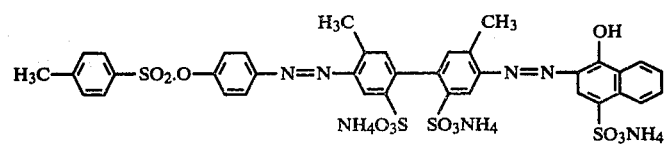 (9)
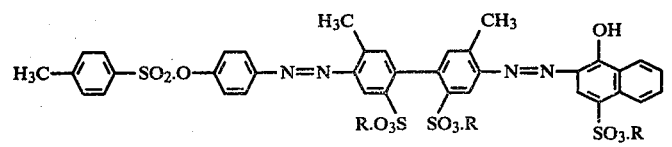 (10)
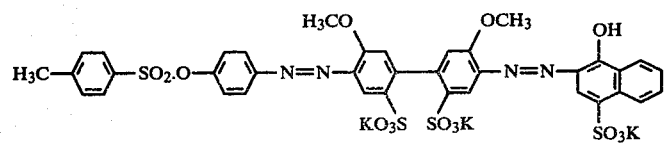 (11)

-continued
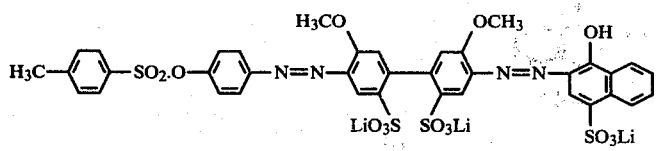 (12)
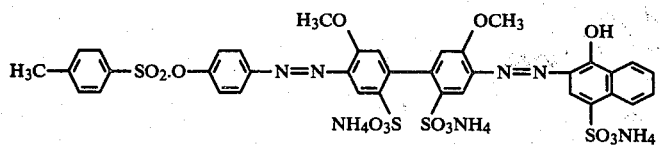 (13)
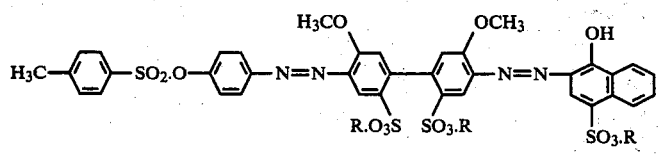 (14)
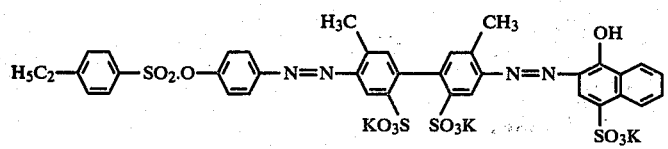 (15)
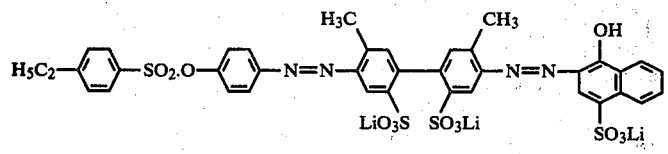 (16)
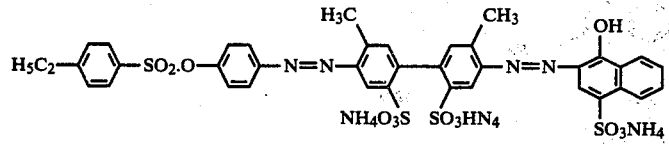 (17)
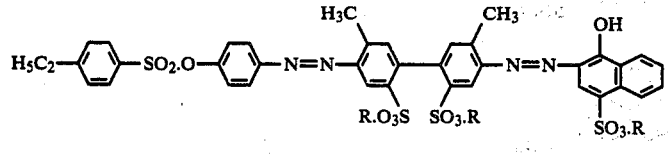 (18)
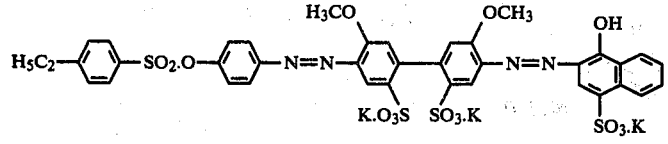 (19)
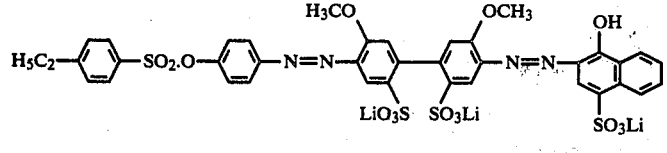 (20)
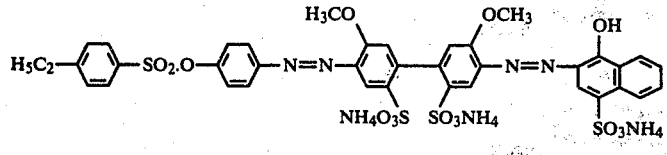 (21)

-continued
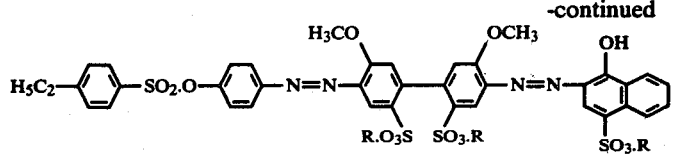 (22)
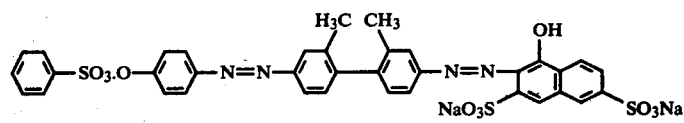 (23)
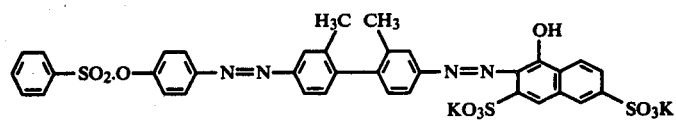 (24)
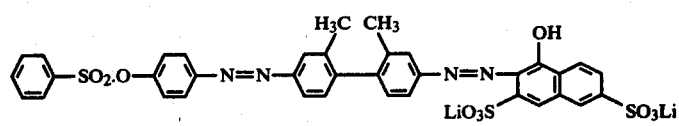 (25)
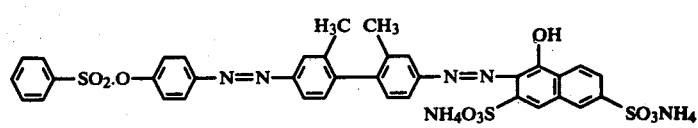 (26)
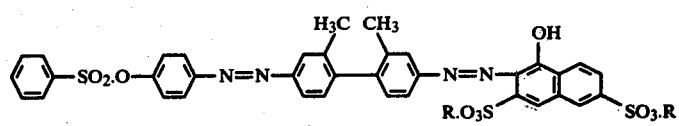 (27)
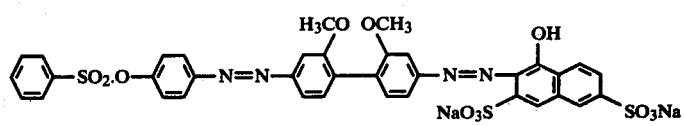 (28)
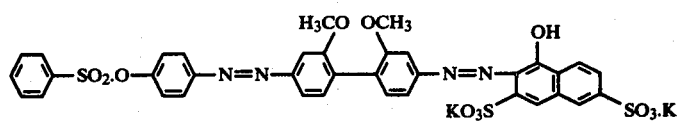 (29)
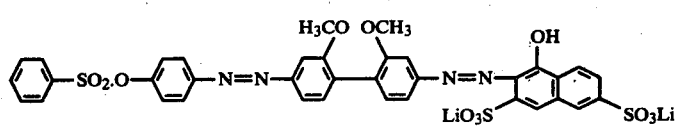 (30)
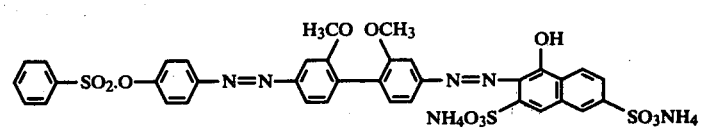 (31)
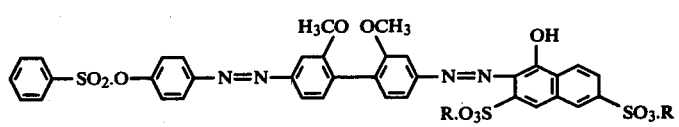 (32)
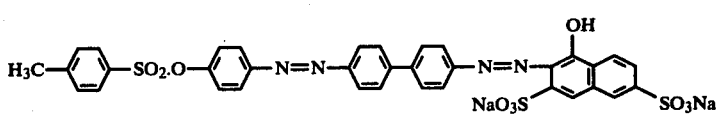 (33)
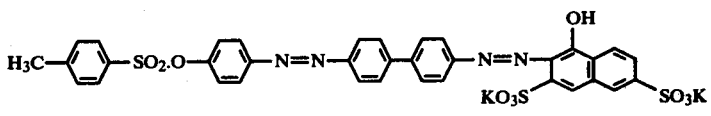 (34)

-continued
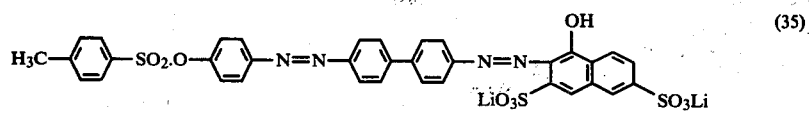 (35)
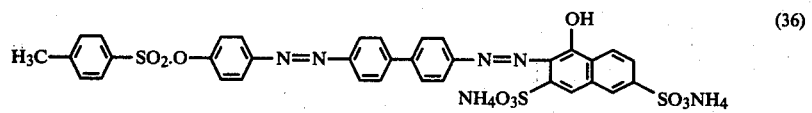 (36)
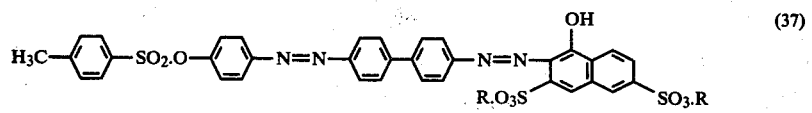 (37)
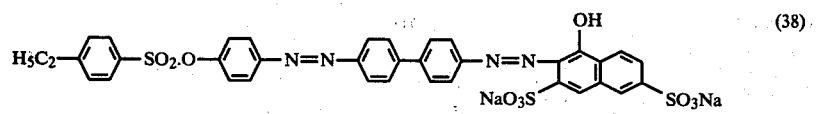 (38)
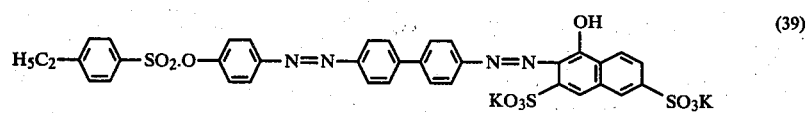 (39)
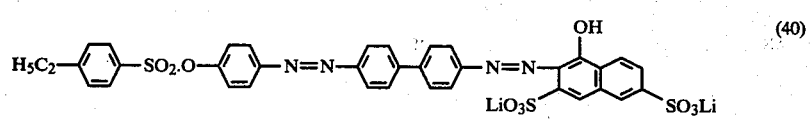 (40)
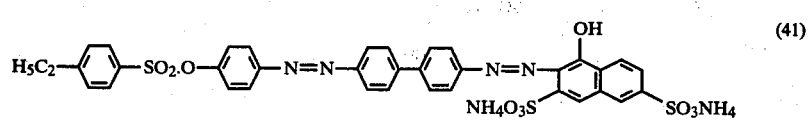 (41)
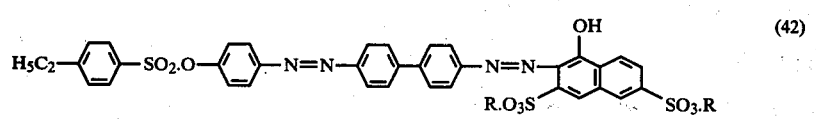 (42)
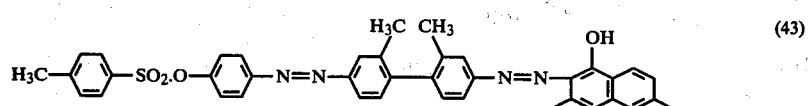 (43)
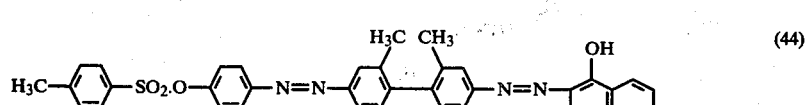 (44)
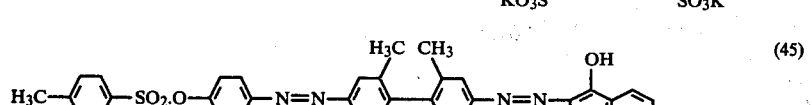 (45)
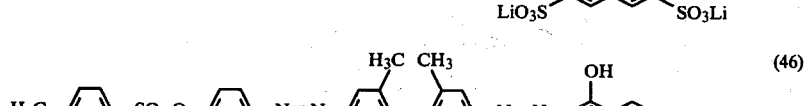 (46)
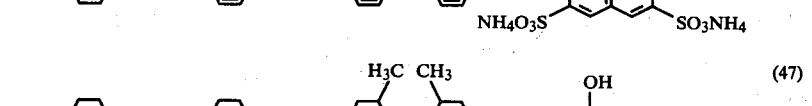 (47)

-continued
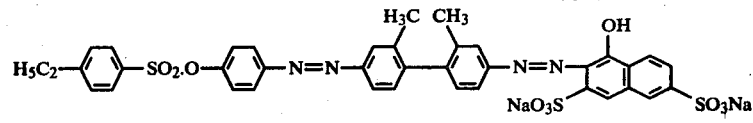
(48)
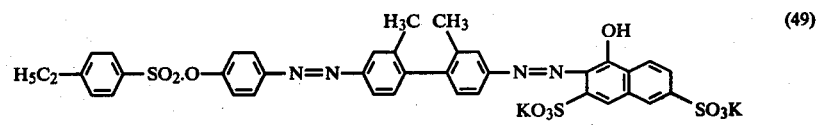
(49)
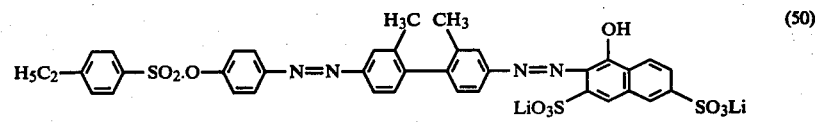
(50)
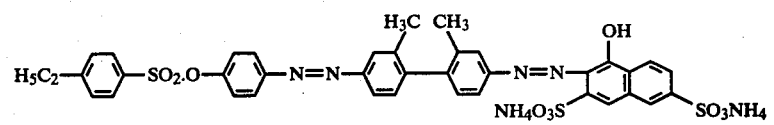
(51)
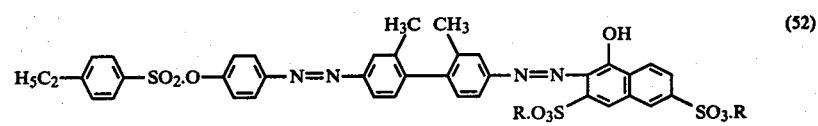
(52)
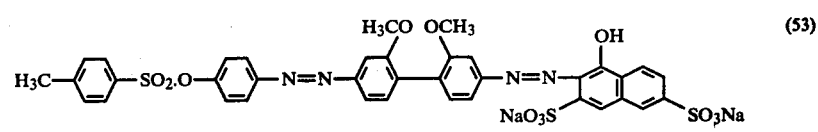
(53)
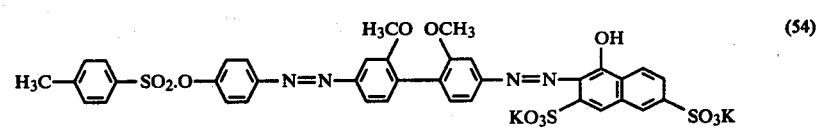
(54)
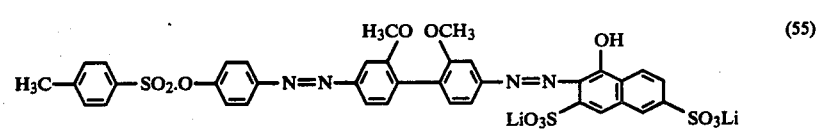
(55)
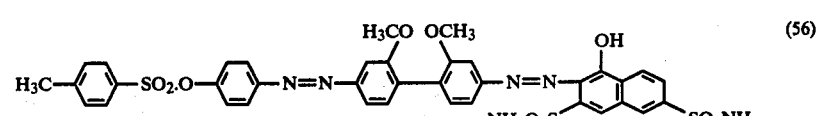
(56)
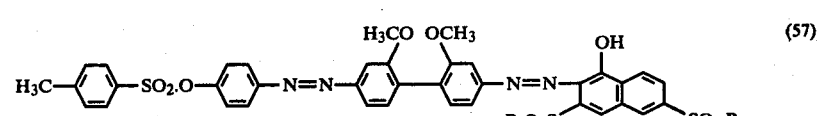
(57)
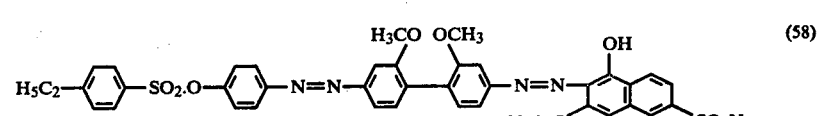
(58)
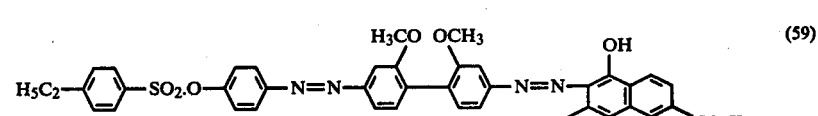
(59)
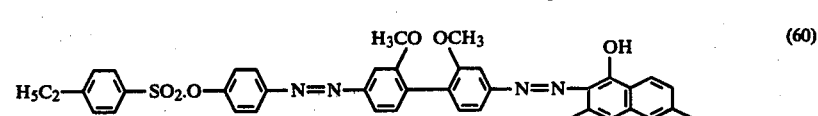
(60)

-continued
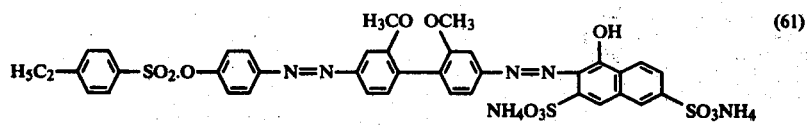
(61)
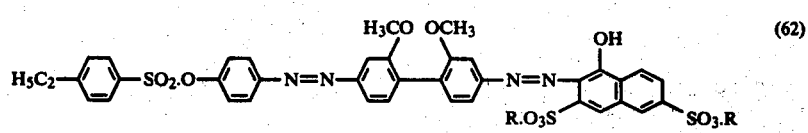
(62)
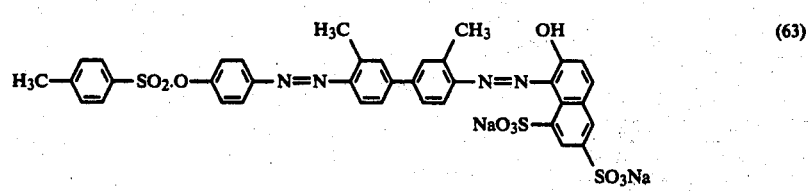
(63)
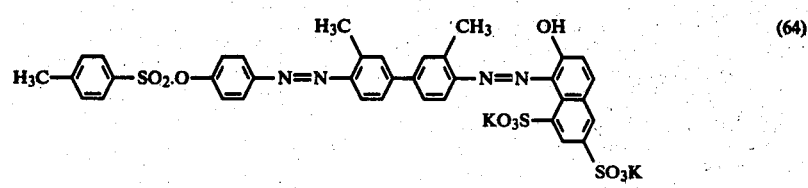
(64)
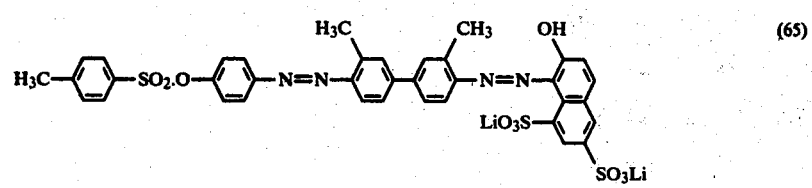
(65)
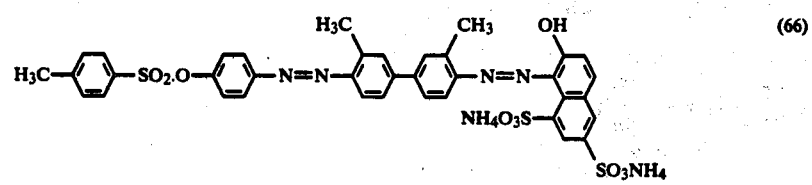
(66)
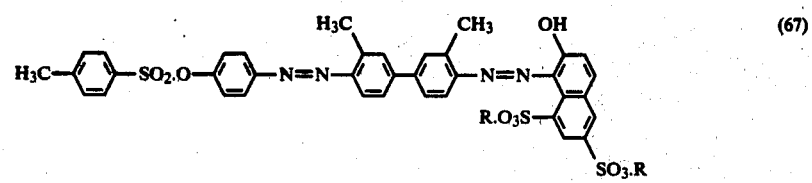
(67)
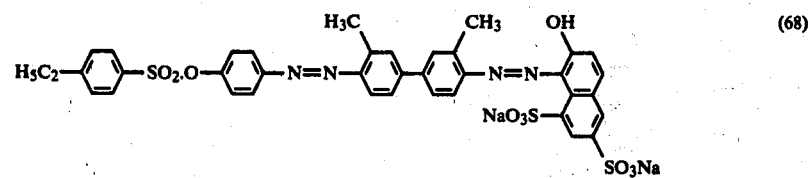
(68)
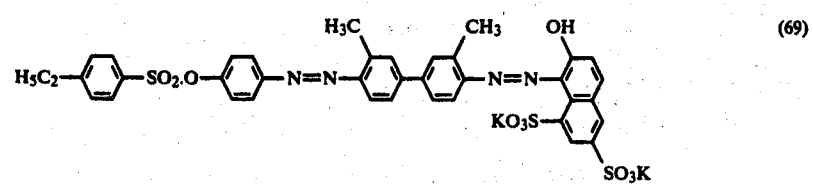
(69)

-continued
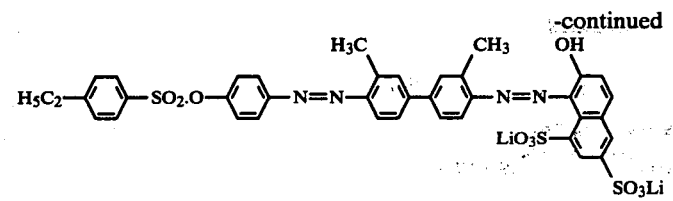 (70)
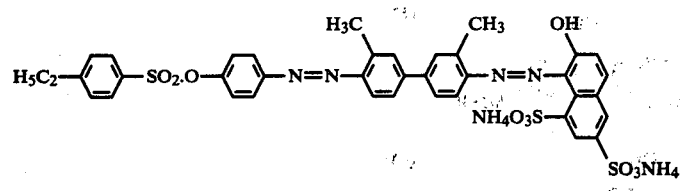 (71)
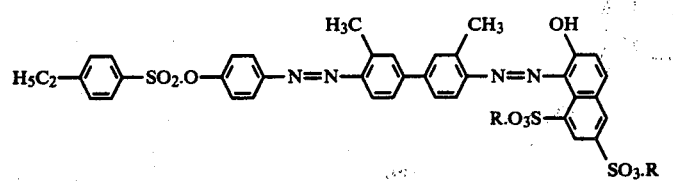 (72)
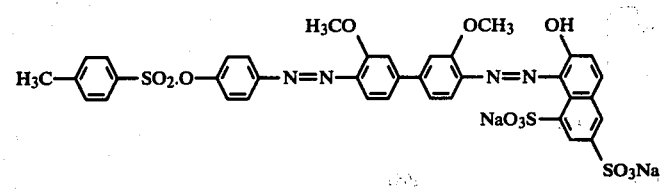 (73)
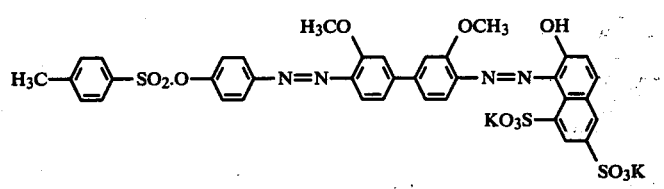 (74)
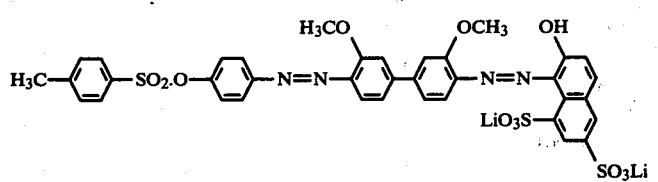 (75)
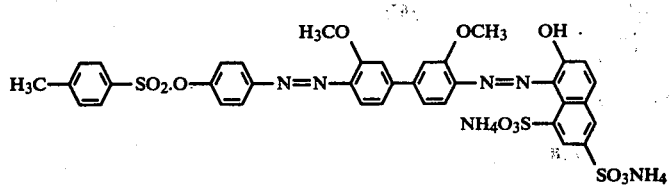 (76)
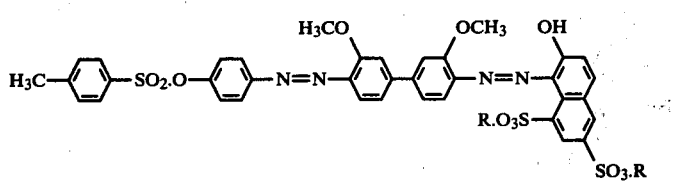 (77)
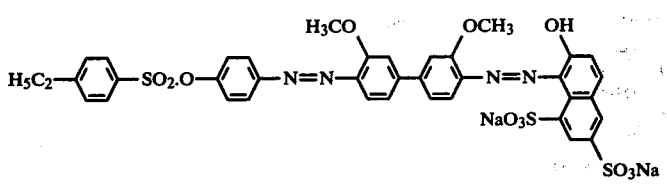 (78)

-continued
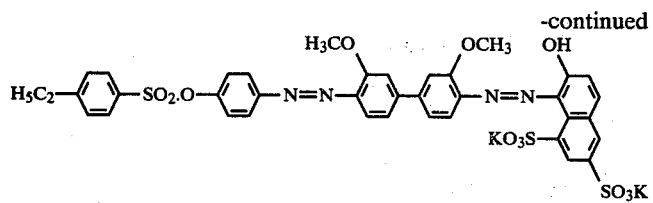 (79)
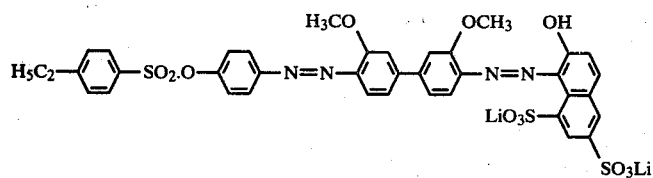 (80)
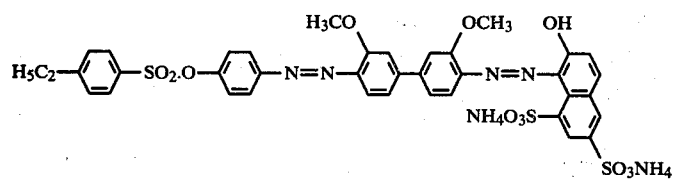 (81)
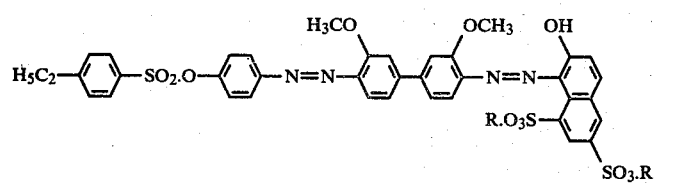 (82)
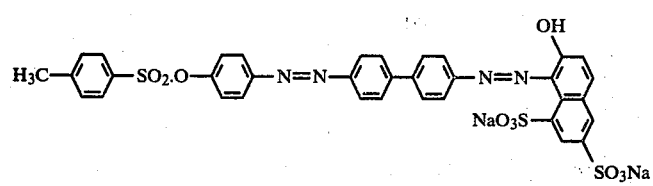 (83)
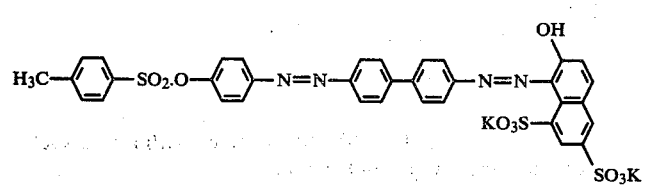 (84)
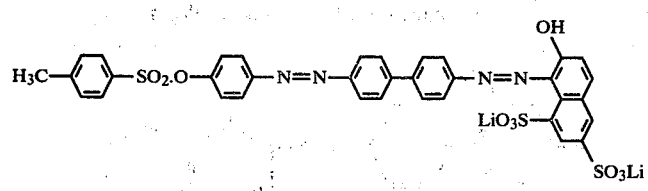 (85)
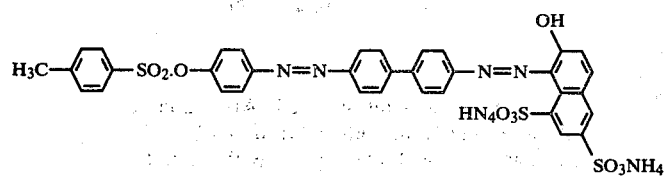 (86)
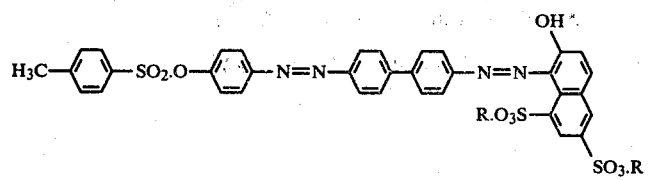 (87)

-continued

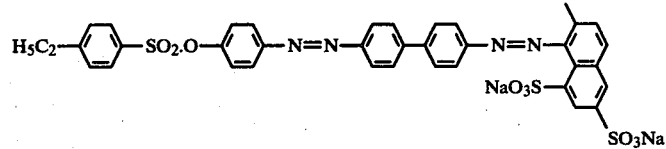 (88)

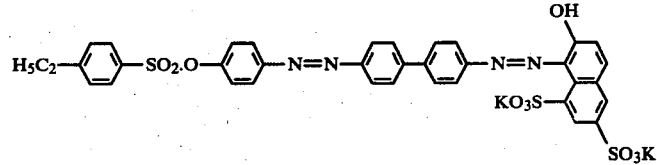 (89)

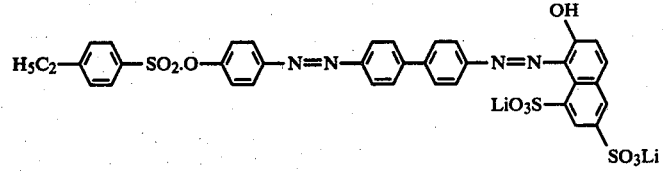 (90)

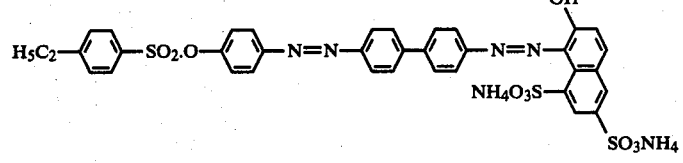 (91)

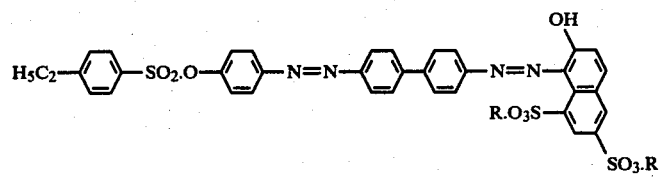 (92)

$$\text{Wherein R is } -\text{HN} \begin{array}{l} \diagup \text{CH}_2-\text{CH}_2-\text{OH} \\ -\text{CH}_2-\text{CH}_2-\text{OH} \\ \diagdown \text{CH}_2-\text{CH}_2-\text{OH} \end{array}$$

The above-mentioned compounds are generally prepared by the following manner.

After tetrazotising a corresponding benzidine derivative and coupling the resulting tetrazonium salt solution with an aromatic sulfonic acid or salt thereof, followed by coupling under the alkaline conditions with phenol. Then, the hydroxyl group according to the phenol is esterified with sulfonyl chloride.

The resulting compound is salted out by addition of salts such as NaCl, $Na_2SO_4$, $Na_2SO_3$, KCl, LiCl, $(NH_4)_2SO_4$, and the like. Alternatively, the resulting compound is precipitated by addition of acid such as hydrochloric acid and the like to treat with amine such as triethanol amine and the like.

Preparation of Compound No. 43

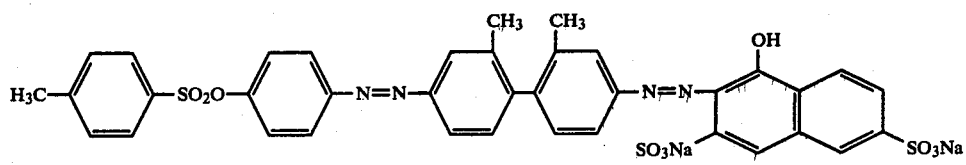

m-Tolidine was tetrazotised. After coupling the resulting tetrazonium salt solution with sodium salt of GR-acid, followed by coupling with phenol under alkaline condition, the hydroxyl group according to the phenol was esterified with p-toluene sulfonyl chloride.

Preparation of Compound No. 1

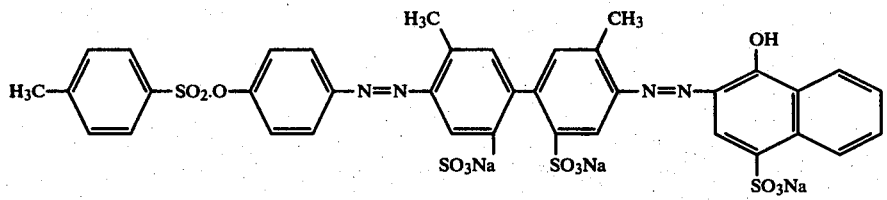

6,6'-Disulfo-o-tolidine was tetrazotised. After coupling the resulting tetrazonium salt solution with sodium salt of 1-naphthol-4-sulfonic acid, followed by coupling with phenol under alkaline condition, the hydroxyl group according to the phenol was esterified with p-toluene sulfonyl chloride.

Preparation of Compound No. 77

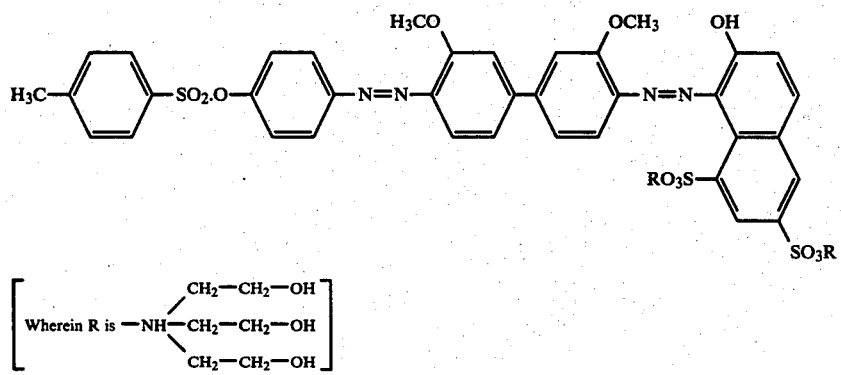

o-Anisidine was tetrazotised. After coupling the resulting tetrazonium salt solution with sodium salt of G-acid, followed by coupling with phenol under alkaline condition, the hydroxyl group according to the phenol was esterified with p-toluene sulfonyl chloride. The resulting compound was precipitated by addition of hydrochloric acid, filtered, and washed with water. Then, the cake was dissolved in an aqueous triethanolamine. The resulting solution was poured in acetone and the resulting precipitate was filtered to give the desired compound.

Among the above-listed compounds, those having sulfo groups of quaternary ammonium salt form are excellent in the dissolution stability in the case of recording liquids containing a water-soluble organic solvent cited below in a large amount.

Liquid media used for compounding the recording liquid of this invention include water and mixtures of water with various water-soluble organic solvents. The water-soluble organic solvents include $C_1$–$C_4$ alkyl alcohols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahyrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; alkylene glycols containing $C_2$–$C_6$ alkylene such as ethylene glycol, propylene glycol, butylene glycol, triethylene glycol, 1,2,6-hexanetriol, thiodiglycol, hexylene glycol, and diethylene glycol; glycerol; and lower alkyl ethers of polyhydric alcohols such as ethylene glycol methyl ether, diethylene glycol methyl (or ethyl) ether, and triethylene glycol monomethyl (or monoethyl) ether.

Preferred water-soluble organic solvents among these are diethylene glycol of polyhydric alcohols and triethylene glycol monomethyl (or monoethyl) ether of lower alkyl ethers of polyhydric alcohols.

Contents of said water-soluble organic solvents in the recording liquid are generally in the range of 5–95%, preferably 10–80%, and particularly 20–50%, by weight based on the total weight of the recording liquid composition.

The recording liquid of this invention prepared from the components mentioned above is in itself excellent and balanced in recording performance characteristics (signal responsiveness, stability for producing droplets, ejection stability, long-hour continuous recording workability, and ejection stability after a long rest), preservation stability, dissolution stability of recorging agent, fixing properties for recording paper and resistance of recorded image to water, alcohol, light, and weather. However, miscellaneous additives hitherto known may also be incorporated into the present recording liquid for further improvement of the characteristics. For instance, such additives are viscosity modifiers such as poly(vinyl alcohol), cellulose derivatives, and other water-soluble resins; various kinds of surfactants, cationic, anionic, and nonionic; surface tension modifiers such as diethanolamine and triethanolamine; and pH conditioners such as buffers.

For preparing the recording liquid to be used for ink-jet recording of the type based on the electrification of recording liquid, an inorganic salt such as lithium chloride, ammonium chloride or sodium chloride is used as a resistivity modifier. Urea or thiourea is suitably used for improving the water-retentivity of the recording liquid at the tip of the ejecting orifice. When the recording liquid is used for ink-jet recording of the type based on the action of thermal energy, thermal properties (e.g. specific heat, coefficient of thermal expansion, and heat conductivity) of the recording liquid are conditioned occasionally.

For applying the recording liquid of this invention to the recording by means of usual writing tools, it is necessary to modify viscosity and other physical properties by considering the affinity with various materials on which a record is made.

This invention will be illustrated in more detail with reference to the following Examples: In the Examples, the Nos. used for specifying dyes are all the same ones as shown already in this Specification.

EXAMPLE 1

| Recording Liquid Composition No. 1 | |
| --- | --- |
| Dye No. 1 cited above | 5 parts by weight |
| Diethylene glycol | 35 parts by weight |
| Deionized water | 60 parts by weight |
| Recording Liquid Composition No. 2 | |
| Dye No. 2 cited above | 5 parts by weight |
| Diethylene glycol | 35 parts by weight |
| Deionized water | 60 parts by weight |
| Recording Liquid Composition No. 3 | |
| Dye No. 3 cited above | 5 parts by weight |
| Diethylene glycol | 35 parts by weight |
| Deionized water | 60 parts by weight |
| Recording Liquid Composition No. 4 | |
| Dye No. 4 cited above | 5 parts by weight |
| Diethylene glycol | 35 parts by weight |
| Deionized water | 60 parts by weight |
| Recording Liquid Composition No. 5 | |
| Dye No. 5 cited above | 5 parts by weight |
| Diethylene glycol | 35 parts by weight |
| Deionized water | 60 parts by weight |
| Recording Liquid Composition No. 6 | |
| Dye No. 6 cited above | 5 parts by weight |
| Diethylene glycol | 35 parts by weight |
| Deionized water | 60 parts by weight |

The above-mentioned recording liquid compositions were prepared each by thorough mixing, filtering the solution under pressure through a 1μ-pore size Teflon filter, and degassing the filtrate in vacuo. On the resulting 6 types of recording liquid, the following items $T_1$–$T_5$ were tested by using a recording apparatus having an on-demand type of recording head (50μ-dia. ejecting orifice, piezo oscillator driving voltage 60 V, frequency 4 KHz), giving good results in all the cases.

$T_1$ (prolonged storage stability of recording liquid)

The recording liquid compositions Nos. 1–6 were sealed separately in glass containers and stored at −30° C. and at 60° C. for 6 months, all did not separate any insoluble matter appreciable or make a change in physical properties and color.

$T_2$ (ejection stability)

The six liquid compositions each were subjected to continuous recording tests at room temperature, 5° C., and 40° C. for 24 hours, gave high quality images constantly throughout the test period at all the temperatures.

$T_3$ (ejection responsiveness)

Tests of intermittent ejection at two-second intervals and of ejection after standing for two months showed stable uniform recording without causing plugging of the orifice in all the cases.

$T_4$ (quality of image recorded)

Images recorded on the following three types of recording paper were of high optical density and sharp and clear in all the cases. These images, exposed to ambient light in a room for three months, showed 1% or less drops in optical density. Results of immersing the recorded papers in water for one minute showed a very little blotting of the images.

| Paper | Supplier |
| --- | --- |
| IJ recording paper type S | Mitsubishi Paper Mills, Ltd. |
| IJ recording paper type M | Mitsubishi Paper Mills, Ltd. |
| IJ recording paper type L | Mitsubishi Paper Mills, Ltd. |

$T_5$ (fixing properties for recording member)

Images recorded on the above-mentioned three types of recording paper were rubbed with a finger 15 seconds after recording, and shifts and blotting of the rubbed parts were inspected. The results indicated none of the shifts and blotting, verifying excellent fixing properties of the images.

The same tests ($T_1$–$T_5$) were made on the recording liquid compositions prepared by using dyes Nos. 23, 28, 33, 38, 43, 48, 53, 58, 63, 68, 73, 78, 83 and 88 (containing the same amounts of dye, diethylene glycol, and water). All the compositions showed excellent characteristics.

EXAMPLE 2

The following recording liquid compositions were prepared by using dyes Nos. 8, 12, 16, 20, 25, 35, 40, 45, 55, 60, 65, 75, 80, 85, and 90 in the same manner as in Example 1 except for using 4 parts by weight of the dye and the following solvents.

| | |
| --- | --- |
| Triethylene glycol monomethylether | 20 parts by weight |
| N—methyl-2-pyrrolidone | 10 parts by weight |
| Deionized water | 66 parts by weight |

Evaluations of prolonged storage stability, ejection stability, ejection responsiveness, quality of image recorded, and fixing properties for recording member were made on these compositions under the same conditions as in Example 1. As a result, all the compositions exhibited excellent characteristics similarly to Example 1.

EXAMPLE 3

The recording liquid compositions were prepared by using dyes Nos. 10, 18, 22, 27, 32, 37, 42, 47, 52, 57, 62, 67, 72, 77, 82, 85, and 92 in the same manner as in Example 2. The same tests ($T_1$–$T_5$) conducted as in Example 1 showed excellent results on all the compositions.

EXAMPLE 4

Recording liquids Nos. 1–6 prepared in Example 1 were filled in commercial fountain pens separately and recording was made on plain paper. The results showed no blotting of image and high rates of absorption of recording liquid in all the cases.

EXAMPLES 5–17

Recording liquids of the following compositions were prepared and tested for $T_1$–$T_5$, in the same manner as in Example 1.

The results indicated that all these recording liquids have good characteristics, particularly excellent in recording workability, fixing properties, sharpness of image, and the like.

| Example No. | Dye No. (parts by wt.) | Liquid medium and other components (parts by wt.) |
|---|---|---|
| 5 | 17 (3) | Water (62) Ethylene glycol (30) 1,2,6-hexanetriol (5) |
| 6 | 11 (4) | Water (61) Glycerol (25) Trithanolamine (10) |
| 7 | 53 (3) | Water (67) Diethylene glycol (30) Methyl p-hydroxybenzoate (0.1) |
| 8 | 4 (2) | Water (68) Triethylene glycol monomethyl ether (30) Polyoxyethylene nonylphenol ether (0.1) |
| 9 | 21 (3) | Water (72) Propylene glycol (20) Dimethylformamide (5) |
| 10 | 62 (3) | Water (57) Ethyl alcohol (10) Glycerol (30) Sodium dehydroacetate (0.1) |
| 11 | 24 (5) | Water (55) Ethylene glycol (35) 1,2,6-Hexanetriol (5) |
| 12 | 32 (4) | Water (41) Triethylene glycol (30) Triethylene glycol monomethyl ether (25) |
| 13 | 57 (2) | Water (73) Glycerol (20) Triethanolamine (5) |
| 14 | 13 (3) | Water (57) Triethylene glycol (35) Thiodiglycol (5) |
| 15 | 1 (3) | Water (76) Ethylene glycol (20) Lithium chloride (1) |
| 16 | 72 (7) | Water (63) Triethylene glycol monomethyl ether (20) Glycerol (10) |
| 17 | 85 (1) | Water (64) Ethylene glycol (30) Polyethylene glycol #200 (5) |

What I claim is:

1. A recording liquid characterized by containing as a dye a compound represented by the formula

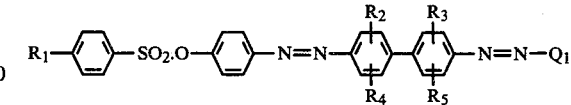

wherein $R_1$ represents hydrogen or $C_1$–$C_2$ alkyl, $R_2$ and $R_3$ each represent hydrogen, $C_1$–$C_2$ alkyl, or $C_1$–$C_2$ alkoxy, $R_4$ and $R_5$ represent hydrogen or sulfo in salt form with base, and $Q_1$ represents naphthyl substituted by hydroxyl and by sulfo in salt form with base in water or a mixture of water and a water-soluble organic solvent.

2. A recording liquid of claim 1, wherein said compound is contained in an amount within the range of 0.5–20% by weight based on the recording liquid.

3. A recording liquid of claim 1, wherein said water-soluble organic solvent is a polyhydric alcohol.

* * * * *